US007898186B2

(12) United States Patent
Mühlschlegel

(10) Patent No.: US 7,898,186 B2
(45) Date of Patent: Mar. 1, 2011

(54) CIRCUIT ARRANGEMENT AND METHOD FOR THE OPERATION OF A HIGH-PRESSURE GAS DISCHARGE LAMP

(75) Inventor: Joachim Mühlschlegel, Gröbenzell (DE)

(73) Assignee: OSRAM Gesellschaft mit beschränkter Haftung, München (DE)

( * ) Notice: Subject to any disclaimer, the term of this patent is extended or adjusted under 35 U.S.C. 154(b) by 440 days.

(21) Appl. No.: 12/086,405

(22) PCT Filed: Nov. 30, 2006

(86) PCT No.: PCT/EP2006/069161

§ 371 (c)(1),
(2), (4) Date: Jun. 12, 2008

(87) PCT Pub. No.: WO2007/068604

PCT Pub. Date: Jun. 21, 2007

(65) Prior Publication Data

US 2009/0267529 A1 Oct. 29, 2009

(30) Foreign Application Priority Data

Dec. 14, 2005 (DE) ....................... 10 2005 059 764

(51) Int. Cl.
*H05B 41/26* (2006.01)
*H05B 37/02* (2006.01)

(52) U.S. Cl. ....................................... 315/246; 315/307

(58) Field of Classification Search ................. 315/246, 315/224, 244, 209 R, 307, DIG. 2, DIG. 7
See application file for complete search history.

(56) References Cited

U.S. PATENT DOCUMENTS 6,424,100 B1 * 7/2002 Kominami et al. .......... 315/307

(Continued)

FOREIGN PATENT DOCUMENTS

EP 0 397 334 A1 11/1990

(Continued)

OTHER PUBLICATIONS

Duk Jin Oh et al: "A Novel Complex Modulation Method for the Metal Halide Lamp Ballast", Nov. 5, 2002, pp. 377-382.

(Continued)

*Primary Examiner*—Douglas W Owens
*Assistant Examiner*—Minh D A
(74) *Attorney, Agent, or Firm*—Holtz, Holtz, Goodman & Chick, P.C.

(57) ABSTRACT

A circuit arrangement for providing a lamp wattage to a high-pressure gas discharge lamp (Lp), the arrangement includes an inverter (T1, T2) which supplies to the high-pressure gas discharge lamp (Lp), a lamp current (IL) which is essentially an alternating current with an operating frequency which is frequency modulated in a frequency range between a minimum frequency and a maximum frequency, an arithmetic mean is defined which is equal to the temporal mean of the frequency values for the operating frequency, swept in a lamp operation. A limit mean is defined which is equal to one half of the sum of minimum frequency and maximum frequency and is less that the arithmetic mean.

18 Claims, 2 Drawing Sheets

U.S. PATENT DOCUMENTS

Figure 1:
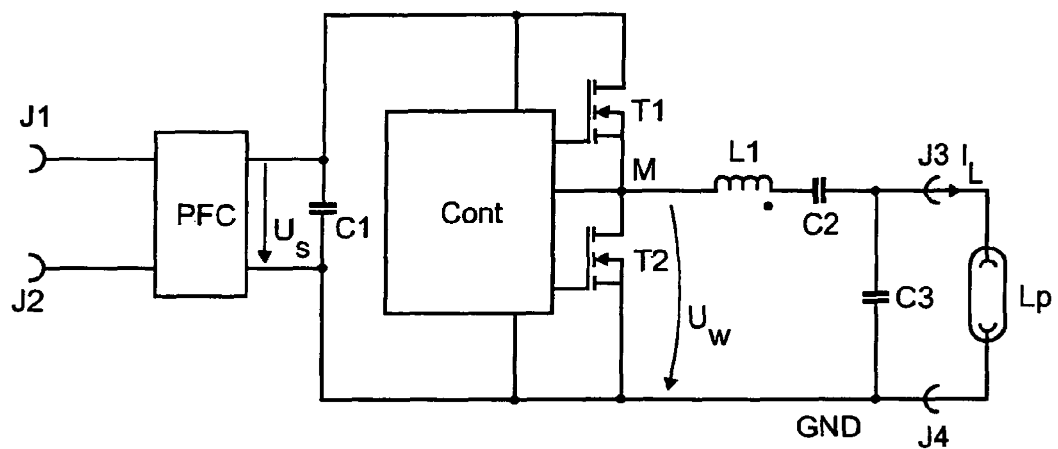

| | | | | |
|---|---|---|---|---|
| 6,509,698 | B1 * | 1/2003 | Kominami et al. | 315/291 |
| 6,680,585 | B2 * | 1/2004 | Trestman | 315/291 |
| 6,967,449 | B2 * | 11/2005 | Ishihara et al. | 315/307 |
| 2003/0111968 | A1 | 6/2003 | Trestman | |

FOREIGN PATENT DOCUMENTS

| | | | |
|---|---|---|---|
| EP | 0 893 943 | A1 | 1/1999 |
| EP | 1 434 471 | A1 | 6/2004 |
| EP | 1 519 637 | A2 | 3/2005 |

OTHER PUBLICATIONS

Bill Andreycak, Phase Shifted, Zero Voltage Transition Design Considerations and the UC3875 PWM Controller, May 1997.

* cited by examiner

CIRCUIT ARRANGEMENT AND METHOD FOR THE OPERATION OF A HIGH-PRESSURE GAS DISCHARGE LAMP

This application is a U.S. National Phase Application under 35 USC 371 of International Application PCT/EP2006/069161, filed Nov. 30, 2006, which is incorporated herein in its entirety by this reference.

TECHNICAL FIELD

The invention relates to a circuit arrangement for operating high-pressure gas discharge lamps. In the text which follows, high-pressure gas discharge lamps will also be called lamps in brief. Furthermore, the invention relates to a method for operating such lamps. In particular, the invention deals with avoiding acoustic resonances which may occur during the operation of these lamps.

PRIOR ART

Acoustic resonances are a familiar problem in the operation of high-pressure gas discharge lamps. Depending on the geometry and on the pressure in the lamp, these resonances occur in a frequency range between 5 kHz and 1000 kHz and can lead to arc irregularity and even to the destruction of the lamp in the case of distinct resonances. Operating a lamp with an alternating current which has a frequency in the said frequency range is therefore not absolutely reliable.

For this reason, operating devices which operate the lamp in the so-called square wave mode have become widely used on the market. However, the square wave mode requires great circuit complexity which is why there are efforts to operate the lamp in the so-called high frequency mode in spite of the risk of acoustic resonances. In this mode, the lamps are supplied with an alternating current in the specified frequency range because an operating device can be implemented particularly cost-effectively especially in this frequency range.

In the document US 2003/0111968A1 (Trestman), an operating device is described which operates a lamp at an operating frequency which is frequency modulated.

It is the aim of the modulation that a lamp current, at frequencies at which the lamp has a resonance point, acts on the lamp only so briefly that no resonance forms.

In the abovementioned prior art, the operating frequency is modulated within a range of 50 kHz around a center frequency. The modulation is controlled by a residual ripple of a supply voltage. The document specified talks about a constant supply voltage which has an actually unwanted residual ripple of, for example, 6 Vrms which is caused by a feeding line voltage. Due to the rectification, the residual ripple has 120 Hz at a line frequency of 60 Hz. The lamp current thus has an operating frequency which is modulated with a modulation frequency of 120 Hz.

The disadvantageous factor in the prior art described is that, in spite of the modulated operating frequency, disturbing resonance phenomena occur unless a frequency range is selected in which the lamp only has weak resonances. The operating frequency range covered by the modulation thus avoids frequency ranges in which strong major resonances of the lamp to be operated occur. The result in the prior art is that a frequency range in which the operating frequency occurs must be adapted to the lamp to be operated. The prior art does not guarantee that two lamps which have comparable performance data can be operated in the same frequency range.

DESCRIPTION OF THE INVENTION

It is the object of the present invention to develop a circuit arrangement for operating high-pressure gas discharge lamps with modulated operating frequency in such a manner that a flicker-free operation of the lamp is possible even when the operating frequency covers a frequency range in which the lamp to be operated has strong acoustic resonances.

This object is achieved by a circuit arrangement comprising an inverter which supplies to the high-pressure gas discharge lamp a lamp current which is essentially an alternating current with an operating frequency which is frequency modulated in a frequency range between a minimum frequency and a maximum frequency, as a result of which, on the one hand, a limit mean is defined which is equal to one half of the sum of minimum frequency and maximum frequency and, on the other hand, an arithmetic mean is defined which is equal to the temporal mean of the frequency values for the operating frequency, swept in a lamp operation, the circuit arrangement being characterized in that the limit mean is less than the arithmetic mean.

The invention is based on the finding that the distinctness of the resonance points of the lamp generally decreases with increasing frequency, i.e., at low frequencies, it is critical if the lamp is provided with much energy since strong resonances can form. At high frequencies, in contrast, more energy can be fed to the lamp since the resonances are less distinct there. The teaching for action according to the invention is based on this finding. In the case of a linear modulation such as is described, e.g. in EP 1 519 637 A2 (Butler), the operating frequency increases linearly with time. In this case, the arithmetic mean of the operating frequency has the same value as the mean of the minimum and the maximum frequency assumed by the operating frequency (limit mean). No frequency value is preferred. The energy input into the lamp is equal at all frequency values assumed by the operating frequency.

In the document US 2003/0111968A1 (Trestman), the modulation is sinusoidal. The energy input into the lamp is thus no longer equal at all frequency values. Frequency values in the vicinity of the maximum frequency and frequency values in the vicinity of the minimum frequency are preferred. Nevertheless, the arithmetic mean of the operating frequency and the limit mean are equal.

In a circuit arrangement according to the invention, the arithmetic mean of the operating frequency is greater than the limit mean. The consequence is that the energy is input into the lamp preferably at higher frequency values. At low frequency values, comparatively little energy is coupled into the lamp as a result of which the resonance points prevailing there are only weakly excited. In this context, "weakly excited" means that the energy absorbed by the resonant oscillation is insufficient for producing a plasma or gas transport in the discharge vessel. This avoids arc irregularity and thus flickering phenomena. Frequency values which are above the limit mean are called higher frequency values. Correspondingly, low frequency values are below the limit mean.

In order to determine the limit mean, the mean is to be formed from the maximum frequency and the minimum frequency according to the above definition. In this context, the maximum frequency is the maximum frequency value assumed by the operating frequency due to the frequency modulation during the operation of a lamp. Frequency values assumed by the operating frequency, e.g. during ignition, are not taken into consideration. Neither are frequency values which only represent fluctuations of the operating frequency taken into consideration. At such frequency values, no significant amount of energy is coupled into the lamp. The frequency modulation is typically periodic with a period in the region of 10 milliseconds. Frequency values assumed during a period of shorter than 10 microseconds can be considered to be fluctuations. The power spectrum of the lamp wattage is typically rectangular, wherein the plateau of the rectangle can also be a ramp which rises with increasing frequency. The frequency values which limit the rectangle mark the minimum and the maximum frequency. Frequency values which represent fluctuations are outside the rectangle and have an amplitude which is significantly below the value of the plateau.

One aspect of the invention is providing a cost-effective operating device with the aid of a circuit arrangement according to the invention. Since the inventive concept can also be implemented by means of a microcontroller, no elaborate circuit change based on the prior art is necessary. Instead, it may be sufficient to change the software in a microcontroller in order to achieve stable lamp operation with the aid of the present invention. In addition, an operating device according to the invention is also capable of operating lamps having different resonance points.

In general, a coupling network which has a transfer function which describes the dependence of the amplitude of the lamp current on the operating frequency is connected between the inverter and the lamp. The coupling network generally has a low-pass characteristic, i.e., at low frequencies, more energy is fed into the lamp than at high frequencies. As a result, especially those frequencies at which strong resonances occur are less attenuated. The wider the frequency band in which the operating frequency is modulated, the stronger this effect is. A further aspect of the invention is, therefore, that the frequency-dependence of the coupling network is compensated for. This is advantageously achieved by a variation of the operating frequency with time which is selected in such a manner that the power spectrum of the power of an operated lamp is uniformly distributed or increases monotonically with frequency. The transfer function is just compensated for with an equal distribution of the power spectrum. To shift the energy injection into the lamp even more toward higher frequencies, overcompensation of the transfer function can also be implemented. The power spectrum of the power of an operated lamp then increases monotonically with frequency.

Apart from the instability of the lamp, the frequency-dependence of the coupling network produces a further problem. Without compensation of this frequency-dependence, a frequency modulation of the operating frequency causes an amplitude modulation of the lamp current. This can lead to a flickering of the lamp even without resonance effects. The further the minimum frequency and the maximum frequency of the operating frequency are apart, the more this problem will become apparent. Particularly strong flickering phenomena can occur from a value of 10 kHz for the difference between minimum frequency and maximum frequency. This problem is solved by the advantageous compensation of the transfer function described above. An extension of the frequency range within which the operating frequency falls is advantageous because the proportion of energy coupled into the lamp at a discrete frequency value then drops. If a frequency value is at a resonance point of the lamp, less energy is supplied to a resonance-related disturbance.

The frequency modulation of the operating frequency is advantageously periodic with a modulation frequency. In principle, a variation of the operating frequency with time is also possible which can be described by noise or chaos.

However, the implementation is then complex and switching relief of semiconductor switches in the inverter is not always guaranteed. The operating frequency has to change so quickly that resonance points are only cited weakly. It is described above what is meant by "excited weakly". Modulation frequencies above 1 Hz are advantageous.

As described above, the implementation of the invention by means of a microcontroller is advantageous. The variation of the operating frequency with time is then not continuous but only discrete frequency values occur for a respective dwell time. The energy input into the lamp can be increased in a frequency range by reducing the difference between two adjacent discrete frequency values or extending the dwell time. Both measures can also be taken at the same time. Energy injection into the lamp in the sense of the invention is given if an average dwell time for frequency values above the limit mean is longer than an average dwell time for frequency values below the limit mean.

An identical effect in the sense of the invention is given if an average difference between two adjacent discrete frequency values is smaller for frequency values above the limit mean than an average difference between two adjacent discrete frequency values for frequency values below the limit mean.

The operating frequency is usually generated by an oscillator. In the advantageous implementation by means of a microcontroller, the operating frequency has in each case a discrete frequency value. The oscillator is typically implemented by means of a so-called timer in the microcontroller. A control device which specifies the respective discrete frequency value for the oscillator can also be implemented by the microcontroller. All frequency values to be assumed successively by the operating frequency are advantageously stored in a storage device. The control device or the microcontroller, respectively, reads out the frequency values one after the other and correspondingly sets the oscillator. The storage device can also be integrated in the microcontroller. The control device or the microcontroller, respectively, also controls the respective dwell time of the oscillator at a frequency value. The dwell times for the respective frequency values can be stored with the frequency values in the storage device.

The transfer function can also be compensated in regulated manner. This requires a measuring device which is suitable for supplying the amplitude of the lamp current to the control device. The control device is then designed in such a manner that it selects a dwell time which increases with falling amplitude. As a result, the oscillator dwells longer on the frequency values which produce a relatively low amplitude of the lamp current. In this manner, the power spectrum of the lamp wattage can be influenced in such a manner that is equally distributed or, if overcompensation of the transfer function is desired, increases monotonically with frequency. Instead of the dwell time, the difference of adjacent discrete frequency values can also be utilized as a control value of the control system with the same effect.

The inverter obtains it energy from a supply voltage. The latter, in turn, is in most cases generated from a line voltage. In general, it is attempted to keep the supply voltage as constant as possible since fluctuations in the supply voltage have a direct effect on the amplitude of the output voltage of the inverter. In particular, a so-called ripple of the supply voltage with twice the frequency of the line voltage is generally kept as small as possible. In contrast, an amplitude modulation can be advantageously combined with the present invention. With a lamp operation, the supply voltage then has a maximum value and a minimum value. With the difference of at least 50 V between maximum value and minimum value, a significant compensation effect occurs.

If the variation of the supply voltage (Us) with time and the variation of the operating frequency with time are synchronized in such a manner that, when the operating frequency assumes its maximum, the supply voltage also assumes its maximum, the compensation effect is optimal. A high instantaneous value of the supply voltage then compensates for great attenuation by the transfer function, at least partially. The compensation effect due to the supply voltage can be combined with the variation of the operating frequency with time according to the invention.

Implementation of the inverter as half-bridge is advantageous since this is cost-effective and has a high efficiency. However, other inverter topologies can also be used such as, e.g. step-down converters, step-up converters, reverse converters, Cuk converters.

The use of a phase-controlled full-bridge inverter is also advantageous. Such an inverter is described in the following document: Bill Andreycak, "Phase Shifted Zero Voltage Transition Design Consideration and the UC3875 PWM Controller", Unitrode Application Note U-136A, 1997. The phase control can be used for controlling the energy which is supplied to the lamp. This can be done in dependence on the operating frequency so that the transfer function of the coupling network is at least partially compensated for. This compensation can be combined advantageously with the variation of the operating frequency with time according to the invention.

The circuit arrangement according to the invention is advantageously a part of an operating device for a high-pressure gas discharge lamp. Apart from the circuit arrangement according to the invention, the operating device can contain a circuit for igniting the lamp, for radio interference suppression, for safety disconnection or for other auxiliary functions. In addition, the operating device comprises a housing and terminals for connecting the lamp and a power supply.

A further aspect of the invention is a method by means of which a lamp can be operated without disturbance by acoustic resonances and in which the power spectrum (PL) of the power of the an operated lamp (Lp) is uniformly distributed or increases monotonically with frequency. In the case of discrete frequency values, the arithmetic mean $\bar{f}_0$ is calculated as follows:

$$\overline{f_o} = \frac{1}{T}\sum_{n=1}^{N}(f_n t_n)$$

It is assumed here that the operating frequency assumes a number of N discrete frequency values fn in each case for a dwell time tn, the N discrete frequency values fn being swept again after the time T. T is thus the period of a modulation frequency.

The method can also be advantageously extended as follows: starting with a stable operation of the lamp the energy input into the lamp is increased successively selectively at all discrete frequency values which can be assumed by the operating frequency, by a factor of 1.2 to 5. With a factor of less than 1.2, the effect can only be measured with difficulty, and above 5, extinction of the lamp can already occur. A device for detecting resonance phenomena examines the lamp current or the lamp voltage or the luminous flux of the lamp for fluctuations. If the fluctuations exceed a predetermined limit value, the increased energy input is set back to a value which is shorter than 80% of the original value. If the fluctuations do not exceed a predetermined limit value, the increased energy input is set back to value which corresponds to the original value.

With this method, the operational reliability with respect to resonance phenomena is increased further. Resonance points which latently exist are recognized and suppressed. The increase in energy input can be implemented in two ways. If the dwell time at a frequency value is extended, the energy input is also increased at this frequency. The second way which has the same effect, of increasing the energy input in one frequency range, consists in reducing the difference between two adjacent frequency values.

BRIEF DESCRIPTION OF THE DRAWING(S)

Figure 3:
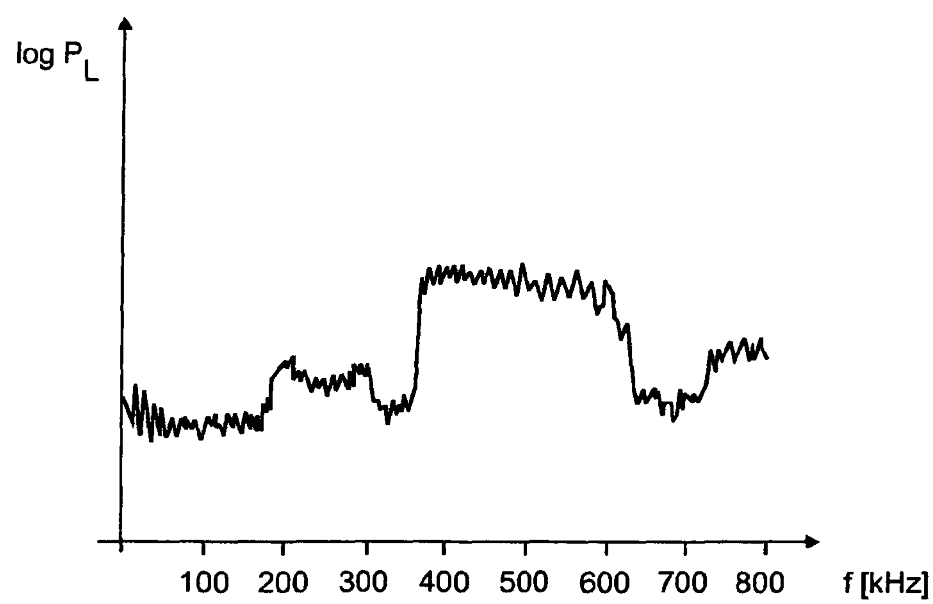
Figure 2:
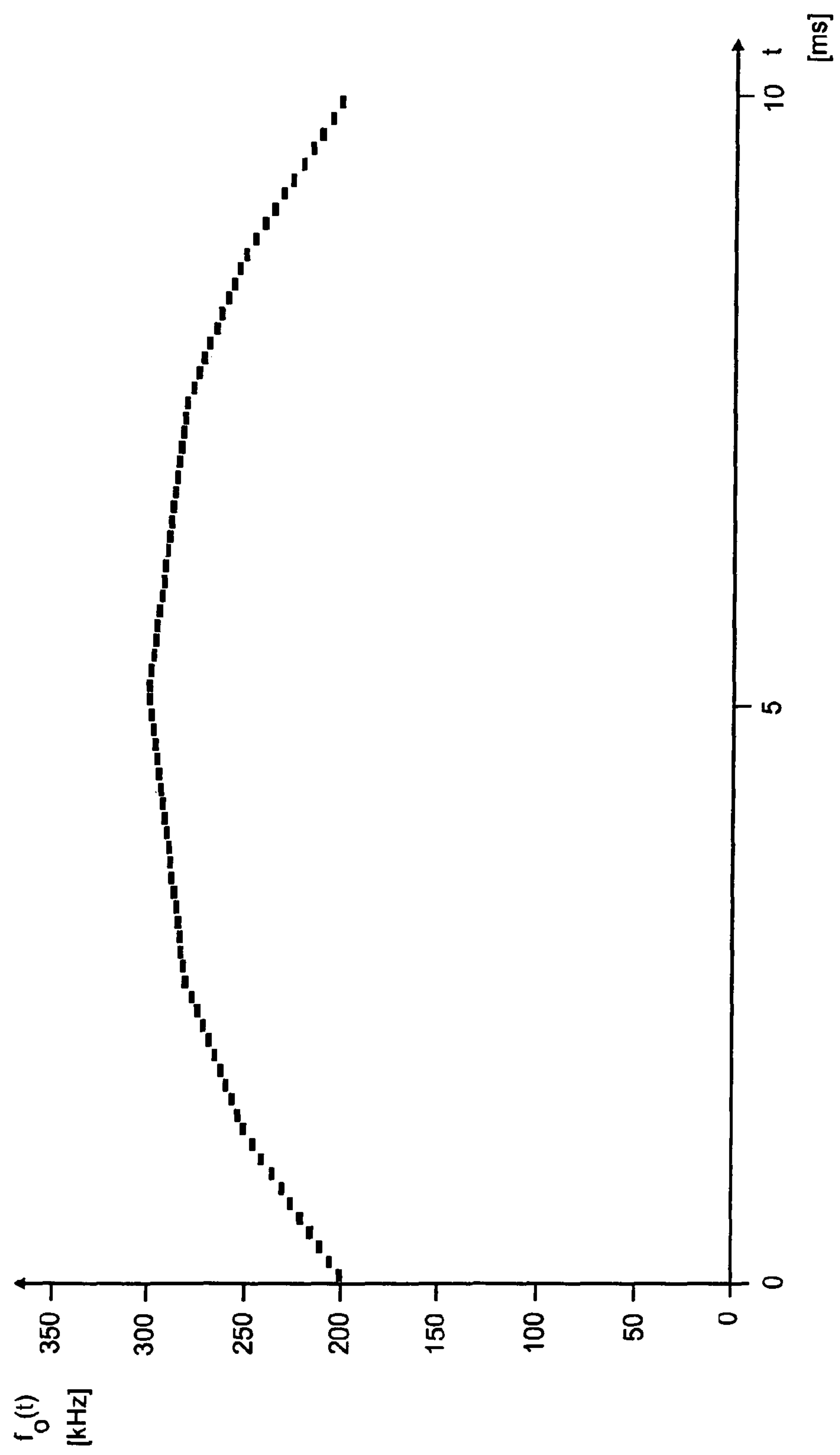

In the text which follows, the invention will be explained in greater detail by means of an exemplary embodiment. In the figures:

FIG. 1 shows a basic circuit diagram for a circuit arrangement by means of which the invention can be implemented, FIG. 2 shows the variation of the operating frequency with time of a circuit arrangement according to the invention, FIG. 3 shows the spectral power density of the lamp wattage with DC component.

PREFERRED EMBODIMENT OF THE INVENTION

FIG. 1 shows a basic circuit diagram of a circuit arrangement by means of which the present invention can be implemented. The circuit arrangement has two input terminals J1 and J2 to which a rectified line voltage can be connected. The input terminals J1 and J2 are coupled to a PFC stage which produces a power factor correction and provides a supply voltage Us. A storage capacitor C1, which is intended to buffer the supply voltage Us, is connected in parallel with the supply voltage Us.

A value of 4.7 microfarad has been found to be advantageous for the storage capacitor C1 for operating a 70 W lamp. With this value, the supply voltage attains a strong amplitude modulation which, in combination with the present invention, can be used for compensating for the transfer function of the coupling network. A potential of the supply voltage is used as GND reference potential for the circuit arrangement.

The supply voltage provides the power supply for an inverter which is constructed as half-bridge inverter. It comprises the series circuit of an upper and a lower switch T1 and T2 which are connected in parallel with the supply voltage. The switches are constructed as MOSFETs, but can also be constructed as other semiconductor switches. The source of the upper switch T1 is connected to the drain of the lower switch at the junction M. The control terminals of the switches, the gates of T1 and T2 in the present case, are connected to a control device Cont. The control device Cont is also connected to the junction M, the supply voltage Us and the GND reference potential. The control device Cont comprises an oscillator which generates an operating frequency by means of which the gates of the switches T1 and T2 are alternately driven. By this means, a rectangular alternating voltage Uw, the amplitude of which follows the supply voltage and corresponds to the frequency of the operating frequency, is produced at the junction M with respect to the GND reference potential. The alternating voltage Uw represents the inverter output voltage of the half-bridge inverter.

A series circuit consisting of a lamp choke L1 and two capacitors C2 and C3 forms a coupling network which is connected between the junction M and the GND reference potential. A lamp Lp can be coupled to the capacitor C3 via terminals J3 and J4. An ignition device which provides a high voltage for a short time for starting the lamp is not shown.

The coupling network produces an impedance transformation from the alternating voltage Uw to the lamp. It can also contain a transformer. The impedance transformation of the coupling network has a transfer function which describes the frequency-dependence of the lamp current Il referred to the alternating voltage Uw. In the present case, the transfer function has a band-pass characteristic. In general, the operating frequency is always above the resonant frequency of the transfer function so that a reduction of the switching load on the switches S1 and S2 can be utilized. Above the resonant frequency, the transfer function has a low-pass characteristic.

The control device Cont preferably comprises a microcontroller and driver circuits for the switches T1 and T2. In the microcontroller, an oscillator which generates the operating frequency is implemented by means of software. The discrete frequency values and their associated dwell times are stored in the memory of the microcontroller. The software causes the oscillator to generate an operating frequency which exhibits in succession the stored frequency values for the stored dwell time. Once the microcontroller has read out a last frequency value stored, there are two possibilities of proceeding: either the microcontroller begins again to read out the frequency values with a first frequency value, or the frequency values are now read out in a reverse order until the first frequency value is reached again. In the first case, a more sawtooth-shaped frequency variation is obtained with time whereas in the second case, a more triangular frequency variation with time is obtained. The more triangular frequency variation has the advantage that no large jumps occur in the operating frequency.

The pure sawtooth and triangular shape mean a linear relationship between time and operating frequency. As a rule, this does not correspond to the teaching of the present invention. A nonlinear or only piecewise linear relation must be achieved over the distance of the frequency values and/or the dwell time. As stated above, it is important in this context that more energy is coupled into the lamp at higher frequencies than at low ones. The technical teaching in this respect is the relation between limit mean and arithmetic mean of the operating frequency stated above.

FIG. 2 shows the variation of the operating frequency with time of a circuit arrangement according to the invention. This is a more triangular piecewise linear variation. More triangular because the operating frequency rises for 5 ms from a minimum frequency up to a maximum frequency and then does not fall back immediately to the minimum frequency but drops back to the minimum frequency during a further 5 ms. The minimum frequency is 200 kHz and the maximum frequency is 300 kHz. This results in a limit mean of 250 kHz. The arithmetic mean is 266 kHz and is thus greater than the limit mean, according to the invention. It is typical of a frequency variation according to the invention that it extends essentially at higher frequencies than is shown by the linear connecting line between minimum frequency and maximum frequency.

The representation in FIG. 2 shows that, in the exemplary embodiment, the dwell time is approximately constant for all frequency values. The variation with time is achieved by a different difference between adjacent frequency values. At frequency values close to the minimum frequency, the distances are greater than at frequency values close to the maximum frequency.

The variation with time repeats periodically after 10 ms. This is no longer shown in FIG. 2. The periodic variation defines a modulation frequency of 100 Hz. This modulation frequency is clearly above 1 Hz so that discrete frequency values do not act on the lamp for such a length of time that plasma or gas flows are produced in the discharge vessel of the lamp. The value of 100 Hz is advantageously selected because this is the value of the ripple frequency of the supply voltage at 50 Hz line frequency. By this means, the amplitude modulation of the supply voltage can compensate for the transfer function of the coupling network in synchronism with the variation of the operating frequency with time.

FIG. 3 shows an example of the spectral power density log PL of the power fed into the lamp Lp in a logarithmic representation. In comparison with the spectrum of the lamp current Il, the frequencies occurring in the power spectrum are doubled. A frequency band between 360 kHz and 620 kHz resulting from a frequency modulation of the operating frequency between a minimum frequency of 180 kHz and a maximum frequency of 310 kHz can be seen clearly. The power density is essentially constant in this frequency band. This is an advantageous consequence of the compensation for the transfer function of the coupling network.

Between 180 kHz and 310 kHz, FIG. 3 shows a further frequency band in which power is coupled into the lamp. This frequency band is produced by a DC component which is superimposed on the lamp current Il. This DC component is advantageously generated by the fact that, in a half-bridge inverter, the switches do not switch precisely symmetrically but the on-time of one switch is in each case predominant. Due to the DC component, the frequency range in which energy is coupled into the lamp can be widened without widening the frequency band which is spanned by the minimum frequency and the maximum frequency. The amplitude of the frequency band generated by the DC component is dependent on the value of the superimposed DC component.

In FIG. 3, the start of a further frequency band can be seen which begins at 720 kHz. This frequency band is produced by the quadrupling of the fundamental frequencies such as minimum frequency and maximum frequency.

The invention claimed is:

1. A circuit arrangement for providing a lamp wattage to a high-pressure gas discharge lamp (Lp), comprising an inverter (T1, T2) which supplies to the high-pressure gas discharge lamp (Lp), a lamp current (IL) which is essentially an alternating current with an operating frequency which is frequency modulated in a frequency range between a minimum frequency and a maximum frequency, a limit mean is defined which is equal to one half of the sum of minimum frequency and maximum frequency, an arithmetic mean is defined which is equal to a temporal mean of the frequency values for the operating frequency, swept in a lamp operation, the circuit arrangement being characterized in that the limit mean is less than the arithmetic mean.

2. The circuit arrangement as claimed in claim 1, comprising a coupling network (L1, C2, C3) which is connected between the inverter (T1, T2) and the lamp (Lp) and has a transfer function which describes the dependence of the amplitude of the lamp current (IL) on the operating frequency, characterized in that a variation of the operating frequency with time is selected in such a manner that the power spectrum (PL) of the power of an operated lamp (Lp) is uniformly distributed or increases monotonically with frequency.

3. The circuit arrangement as claimed in claim 1, characterized in that the frequency modulation of the operating frequency is periodic with a modulation frequency which is greater than 1 Hz.

4. The circuit arrangement as claimed in claim 1, characterized in that the operating frequency only assumes discrete frequency values for a respective dwell time.

5. The circuit arrangement as claimed in claim 4, characterized in that an average dwell time for frequency values above the limit mean is longer than an average dwell time for frequency values below the limit mean.

6. The circuit arrangement as claimed in claim 4, characterized in that an average difference between two adjacent discrete frequency values is less for frequency values above the limit mean than an average difference between two adjacent discrete frequency values for frequency values below the limit mean.

7. The circuit arrangement as claimed in claim 4, characterized by an oscillator which generates the operating frequency with a discrete frequency value, a control device which determines the respective discrete frequency value for the oscillator, a storage device in which the discrete frequency values and the corresponding dwell times are stored and can be read out by the control device.

8. The circuit arrangement as claimed in claim 7, characterized in that the variation of the supply voltage (Us) with time and the variation of the operating frequency with time are synchronized in such a manner that, when the operating frequency assumes its maximum, the supply voltage (Us) also assumes its maximum.

9. The circuit arrangement as claimed in claim 4, characterized by an oscillator which generates the operating frequency with a discrete frequency value, a control device which determines the respective discrete frequency value for the oscillator, a storage device in which the discrete frequency values are stored and can be read out by the control device, a measuring device which is suitable for supplying the amplitude of the lamp current to the control device, the control device being designed in such a manner that it selects a dwell time which increases with falling amplitude.

10. The circuit arrangement as claimed in claim 4 characterized by an oscillator which generates the operating frequency with a discrete frequency value, a control device which determines the respective discrete frequency value for the oscillator, a storage device in which the discrete frequency values are stored and can be read out by the control device, a measuring device which is suitable for supplying the amplitude of the lamp current to the control device, the control device being designed in such a manner that it selects a dwell time which increases with falling amplitude, and the inverter is supplied with a supply voltage (Us), wherein the supply voltage (Us), for operating a high-pressure gas discharge lamp (Lp), obtains its energy from a line voltage and the supply voltage (Us), during a lamp operation, has a maximum value and a minimum value, the difference between maximum value and minimum value being at least 50 V.

11. The circuit arrangement as claimed in claim 1, characterized in that the inverter is supplied with a supply voltage (Us), wherein the supply voltage (Us), for operating a high-pressure gas discharge lamp (Lp), obtains its energy from a line voltage and the supply voltage (Us), during a lamp operation, has a maximum value and a minimum value, the difference between maximum value and minimum value being at least 50 V.

12. The circuit arrangement as claimed in claim 1, characterized in that the difference between maximum frequency and minimum frequency is at least 10 kHz.

13. The circuit arrangement as claimed in claim 1, characterized in that the inverter is a half-bridge inverter.

14. The circuit arrangement as claimed in claim 1, characterized in that the inverter is a phase-controlled full-bridge inverter.

15. An operating device for operating a high-pressure gas discharge lamp (Lp), characterized in that the operating device comprises a circuit arrangement as claimed in claim 1.

16. A method for operating a high-pressure gas discharge lamp (Lp), characterized by the following steps:

reading a frequency value and an associated dwell time out of a storage device, providing an alternating current for a high-pressure gas discharge lamp (Lp), having an operating frequency, the value of which corresponds to the last frequency value read out, retaining the frequency value for the last dwell time read out, reading a next frequency value and an associated dwell time out of a storage device, continuously repeating the first four steps wherein the frequency values and the associated dwell times are selected in such a manner that one half of the sum of the greatest and the smallest frequency value occurring is less than the mean value of the frequency values read out and weighted with the associated dwell time.

17. The method as claimed in claim 16, characterized in that the frequency values and dwell times are selected in such a manner that the power spectrum (PL) of the power of an operated lamp (Lp) is uniformly distributed or increases monotonically with frequency.

18. The method as claimed in claim 16, characterized by the following steps:

extending the dwell time of a frequency value by a factor which is within a range of between 1.2 and 5, examining the lamp current (Il) or the lamp voltage or the luminous flux of the lamp for fluctuations, if the fluctuations exceed a predetermined limit value, the extended dwell time is set back to a value which is shorter than 80% of the original value, if the fluctuations do not exceed a predetermined limit value, the extended dwell time is set back to a value which corresponds to the original value, performing the previous steps for the further frequency values assumed by the operating frequency.

* * * * *